United States Patent
Miyazawa

(10) Patent No.: US 10,282,568 B2
(45) Date of Patent: May 7, 2019

(54) CARD READER

(71) Applicant: NIDEC SANKYO CORPORATION, Suwa-gun Nagano (JP)

(72) Inventor: Shinya Miyazawa, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/019,968

(22) Filed: Jun. 27, 2018

(65) Prior Publication Data

US 2019/0005277 A1 Jan. 3, 2019

(30) Foreign Application Priority Data

Jun. 28, 2017 (JP) ................................. 2017-126361

(51) Int. Cl.
*G06K 7/00* (2006.01)
*G06K 7/06* (2006.01)
*G06K 7/08* (2006.01)

(52) U.S. Cl.
CPC .......... *G06K 7/0013* (2013.01); *G06K 7/0056* (2013.01); *G06K 7/06* (2013.01); *G06K 7/087* (2013.01)

(58) Field of Classification Search
CPC ...... G06K 7/06; G06K 7/0013; G06K 7/0056; G06K 7/087
See application file for complete search history.

(56) References Cited

U.S. PATENT DOCUMENTS

| | | | | |
|---|---|---|---|---|
| 1,933,328 | A * | 10/1933 | Horsfield | G06K 7/04 209/554 |
| 5,010,239 | A * | 4/1991 | Mita | G06K 7/0021 235/440 |
| 5,065,004 | A * | 11/1991 | Mizuno | G06K 7/0013 235/479 |
| 6,149,064 | A * | 11/2000 | Yamaoka | G06K 7/0021 235/479 |
| 6,186,401 | B1 * | 2/2001 | Magana | G06K 7/0021 235/475 |
| 6,702,182 | B1 * | 3/2004 | Kanayama | G06K 7/0021 235/380 |
| 9,563,791 | B2 * | 2/2017 | Takita | G06K 7/084 |

(Continued)

FOREIGN PATENT DOCUMENTS

JP 10027220 A 1/1998

*Primary Examiner* — Daniel I Walsh
(74) *Attorney, Agent, or Firm* — Cantor Colburn LLP

(57) ABSTRACT

A card reader may include a main body frame, an IC contact block and a guide shaft for moving the IC contact block between a contact position and a retreated position. The guide shaft may be inserted through and pulled out from the IC contact block. The main body frame includes a first shaft holding part and a second shaft holding part which hold the ends of the guide shaft. The first shaft holding part is formed with an arrangement hole which is a first cam groove structured to move the IC contact block and the second shaft holding part is formed with a second cam groove structured to move the IC contact block. A coming-off prevention member which prevents coming-off of the guide shaft from the first shaft holding part and the second shaft holding part is detachably attached to the guide shaft or the main body frame.

9 Claims, 5 Drawing Sheets

(56) References Cited

U.S. PATENT DOCUMENTS

| | | | | |
|---|---|---|---|---|
| 2001/0017318 A1* | 8/2001 | Nagata | ............... | G06K 7/0021 235/451 |
| 2001/0019077 A1* | 9/2001 | Buschmann | ......... | G06K 7/0013 235/439 |
| 2003/0102375 A1* | 6/2003 | Watanabe | ............ | G06K 7/0021 235/441 |
| 2004/0262389 A1* | 12/2004 | Nagata | ............... | G06K 7/0021 235/441 |
| 2009/0039586 A1* | 2/2009 | Matsui | ............... | G06K 13/0843 271/8.1 |
| 2011/0084138 A1* | 4/2011 | Akahane | ............... | G06K 7/087 235/449 |
| 2011/0240738 A1* | 10/2011 | Mizawa | ............ | G06K 13/0887 235/449 |
| 2013/0134219 A1* | 5/2013 | Lebaschi | ................. | G06K 7/01 235/440 |
| 2014/0346228 A1* | 11/2014 | Ishikawa | ............ | G11B 5/00808 235/440 |
| 2015/0161418 A1* | 6/2015 | Ishikawa | ................. | G06K 13/06 235/449 |
| 2015/0193641 A1* | 7/2015 | Ishikawa | ............... | G06K 7/0004 235/440 |
| 2015/0213334 A1* | 7/2015 | Ishikawa | ............... | G06K 7/0026 235/449 |
| 2016/0125207 A1* | 5/2016 | Aiyoshi | ............... | G06K 7/0004 235/440 |
| 2016/0189012 A1* | 6/2016 | Uchiyama | ............ | G06K 7/0026 235/479 |
| 2017/0236038 A1* | 8/2017 | Aiyoshi | ............... | G06K 7/0021 235/449 |
| 2017/0316288 A1* | 11/2017 | Aiyoshi | ............... | G06K 13/085 |
| 2018/0232609 A1* | 8/2018 | Miyazawa | ............ | B65H 5/06 |
| 2018/0276424 A1* | 9/2018 | Miyazawa | ............. | G06K 7/08 |
| 2018/0285604 A1* | 10/2018 | Miyazawa | ............. | G06K 7/087 |

\* cited by examiner

CARD READER

CROSS REFERENCE TO RELATED APPLICATION

The present invention claims priority under 35 U.S.C. § 119 to Japanese Application No. 2017-126361 filed Jun. 28, 2017, the entire content of which is incorporated herein by reference.

TECHNICAL FIELD

At least an embodiment of the present invention may relate to a card reader structured to perform reading of data recorded in a contact type IC card and/or recording of data to a contact type IC card.

BACKGROUND

Conventionally, a card reader has been known which is structured to perform reading of data recorded in a contact type IC card and/or recording of data to a contact type IC card (see, for example, Japanese Patent Laid-Open No. Hei 10-27220). The card reader described in the Patent Literature includes a card reader main body in which a card insertion port and a card passage are formed. Further, the card reader includes a plurality of contact springs, which are capable of contacting with an external connection terminal of an IC chip formed on a card, and an IC contact block (contact spring holder) which holds the plurality of the contact springs. Guide grooves are formed in the card reader main body. The IC contact block is provided with projections inserted into the guide grooves. Further, a hook is attached to the IC contact block.

In the card reader described in the Patent Literature, when a card passing the card passage is abutted with a hook of the IC contact block which is urged to a predetermined position by a holder returning spring, the IC contact block is moved along the guide grooves and the contact springs are contacted with an external connection terminal of the card at a predetermined contact pressure. When the contact springs are contacted with the external connection terminal at a predetermined contact pressure, reading of data recorded in the card and/or recording of data to the card are performed.

In an IC card reader such as a card reader described in the Patent Literature, maintenance of an IC contact block may be sometimes required. In this case, maintenance of an IC contact block is easily performed when the IC contact block is detached for performing maintenance. Further, in the IC card reader, there may be a case that replacement of an IC contact block is required. Therefore, in the IC card reader, an IC contact block may be easily detached.

SUMMARY

In view of the problem described above, at least an embodiment of the present invention may advantageously provide a card reader structured to perform reading of data recorded in a contact type IC card and/or recording of data to a contact type IC card, in which an IC contact block which holds IC contact springs is capable of being easily detached.

According to at least an embodiment of the present invention, there may be provided a card reader including a plurality of IC contact springs structured to contact with an external connection terminal of an IC chip which is formed on a card, an IC contact block which holds the plurality of the IC contact springs, a main body frame in which a card moving passage where the card is moved is formed, and a guide shaft for moving the IC contact block between a contact position where the IC contact springs are capable of contacting with the external connection terminal and a retreated position where the IC contact springs are retreated so as not to contact with the external connection terminal. When a direction perpendicular to a moving direction of the card moved in the card moving passage and to a thickness direction of the card moved in the card moving passage is referred to as a right and left direction, the guide shaft is separately formed from the IC contact block and is disposed so that an axial direction of the guide shaft and the right and left direction are coincided with each other. The main body frame includes a first shaft holding part which holds one end side portion of the guide shaft and a second shaft holding part which holds the other end side portion of the guide shaft, and the IC contact block is disposed between the first shaft holding part and the second shaft holding part in the right and left direction. The IC contact block is formed with an insertion hole so as to be penetrated through in the right and left direction through which the guide shaft is inserted and an abutting part structured to abut with one end of the card in the moving direction of the card, and the first shaft holding part is formed with an arrangement hole penetrated through in the right and left direction in which the one end side portion of the guide shaft is disposed and through which the guide shaft is capable of passing in the right and left direction. The arrangement hole is a first cam groove structured to move the IC contact block between the contact position and the retreated position together with the guide shaft and, in addition, the second shaft holding part is formed with a second cam groove structured to move the IC contact block between the contact position and the retreated position together with the guide shaft, and alternatively, the insertion hole is a cam groove structured to move the IC contact block between the contact position and the retreated position together with the guide shaft. In a case that the arrangement hole is the first cam groove and the second cam groove is formed in the second shaft holding part, the IC contact block is capable of moving together with the guide shaft between the contact position and the retreated position with respect to the first shaft holding part and the second shaft holding part and, in a case that the insertion hole is the cam groove, the IC contact block is capable of moving between the contact position and the retreated position with respect to the first shaft holding part, the second shaft holding part and the guide shaft. Further, a coming-off prevention member which prevents coming-off of the guide shaft from the first shaft holding part and the second shaft holding part to the first shaft holding part side in the right and left direction is detachably attached to the guide shaft or the main body frame and, when the one end of the card is abutted with the abutting part, the IC contact block located at the retreated position starts to move toward the contact position.

In the card reader in accordance with at least an embodiment of the present invention, the main body frame includes a first shaft holding part which holds one end side portion of the guide shaft and a second shaft holding part which holds the other end side portion of the guide shaft, and the IC contact block is disposed between the first shaft holding part and the second shaft holding part in the right and left direction. Further, in at least an embodiment of the present invention, the IC contact block is formed with an insertion hole so as to be penetrated through in the right and left direction through which a guide shaft separately formed from the IC contact block is inserted, and the first shaft holding part is formed with an arrangement hole penetrated through in the right and left direction in which the one end side portion of the guide shaft is disposed and through which the guide shaft is capable of passing in the right and left direction. In addition, in at least an embodiment of the present invention, a coming-off prevention member which prevents coming-off of the guide shaft from the first shaft holding part and the second shaft holding part to the first shaft holding part side in the right and left direction is detachably attached to the guide shaft or the main body frame Therefore, according to at least an embodiment of the present invention, when a coming-off prevention member detachably attached to the guide shaft or the main body frame is detached, the guide shaft which is inserted through the insertion hole of the IC contact block can be pulled out at least to the first shaft holding part side. Further, when the guide shaft is pulled out, the IC contact block disposed between the first shaft holding part and the second shaft holding part can be detached. Therefore, according to at least an embodiment of the present invention, the IC contact block can be detached easily.

In at least an embodiment of the present invention, the arrangement hole is the first cam groove and the second cam groove is formed in the second shaft holding part. According to this structure, the insertion hole which is formed in the IC contact block may be, for example, formed as a round-hole. Therefore, in comparison with a case that the insertion hole of the IC contact block is a cam groove, a structure of the IC contact block whose shape may become easily complicated can be simplified.

In at least an embodiment of the present invention, the second shaft holding part is formed with an arrangement recessed part in which the other end side portion of the guide shaft is disposed and which is recessed from one side face in the right and left direction of the second shaft holding part toward the other in the right and left direction, the arrangement recessed part is the second cam groove, and the coming-off prevention member is detachably attached to the guide shaft or the main body frame on the first shaft holding part side in the right and left direction. According to this structure, coming-off of the guide shaft to the second shaft holding part side in the right and left direction can be prevented by utilizing a bottom face of the arrangement recessed part. Accordingly, a member is not required to provide separately for preventing coming-off of the guide shaft to the second shaft holding part side and, as a result, the structure of the card reader can be simplified. Further, according to this structure, when the coming-off prevention member is attached in a state that an end face of the guide shaft inserted through the arrangement hole of the first shaft holding part and the insertion hole of the IC contact block is pressed against the bottom face of the arrangement recessed part, the IC contact block can be attached. Therefore, attaching work of the IC contact block is easy.

In at least an embodiment of the present invention, the guide shaft is formed of steel, and the first shaft holding part and the second shaft holding part are formed of resin. According to this structure, wear resistance of the guide shaft can be enhanced and slidability between the first cam groove and the second cam groove and the guide shaft can be enhanced. Further, according to this structure, a thermal contraction amount of the guide shaft due to influence of ambient temperature change and the like is reduced. Therefore, relative positions of the IC contact springs which are held by the IC contact block in which the guide shaft is inserted through the insertion hole to an external connection terminal of a card located in the card moving passage can be suppressed from being displaced due to ambient temperature change and the like. Accordingly, reading quality and recording quality of data to a card can be suppressed from being deteriorated due to ambient temperature change and the like.

In at least an embodiment of the present invention, the card reader includes two guide shafts and a tension coil spring structured to urge the IC contact block toward the retreated position, and one end side of the tension coil spring is attached to one of the two guide shafts, and the other end side of the tension coil spring is attached to the main body frame. In this case, the IC contact block can be urged toward the retreated position by utilizing the guide shaft.

In at least an embodiment of the present invention, the coming-off prevention member is detachably attached to the main body frame.

In at least an embodiment of the present invention, when one side in the thickness direction of the card is referred to as a first direction, the main body frame is provided with a side face part structuring a face on a side of the first direction of the card moving passage, the side face part is formed with an opening part which is penetrated through the side face part in the thickness direction of the card so that a part of the IC contact block is disposed in the opening part, and the first shaft holding part and the second shaft holding part are formed on the face on the first direction side of the side face part. In addition, a cover member which closes the opening part from the first direction side and covers the first shaft holding part, the second shaft holding part and the IC contact block from the first direction side is detachably attached to the side face part, and a part of the cover member is the coming-off prevention member. According to this structure, coming-off of the guide shaft from the first shaft holding part and the second shaft holding part to the first shaft holding part side in the right and left direction can be prevented by utilizing a part of the cover member which closes the opening part of the side face part and covers the first shaft holding part, the second shaft holding part and the IC contact block. Therefore, the structure of the card reader can be simplified.

In at least an embodiment of the present invention, the cover member is a waterproof cover structured to prevent penetration of liquid from the card moving passage to the first direction side with respect to the side face part.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will be described below with reference to the accompanying drawings.

(Schematic Structure of Card Reader)

Figure 1:
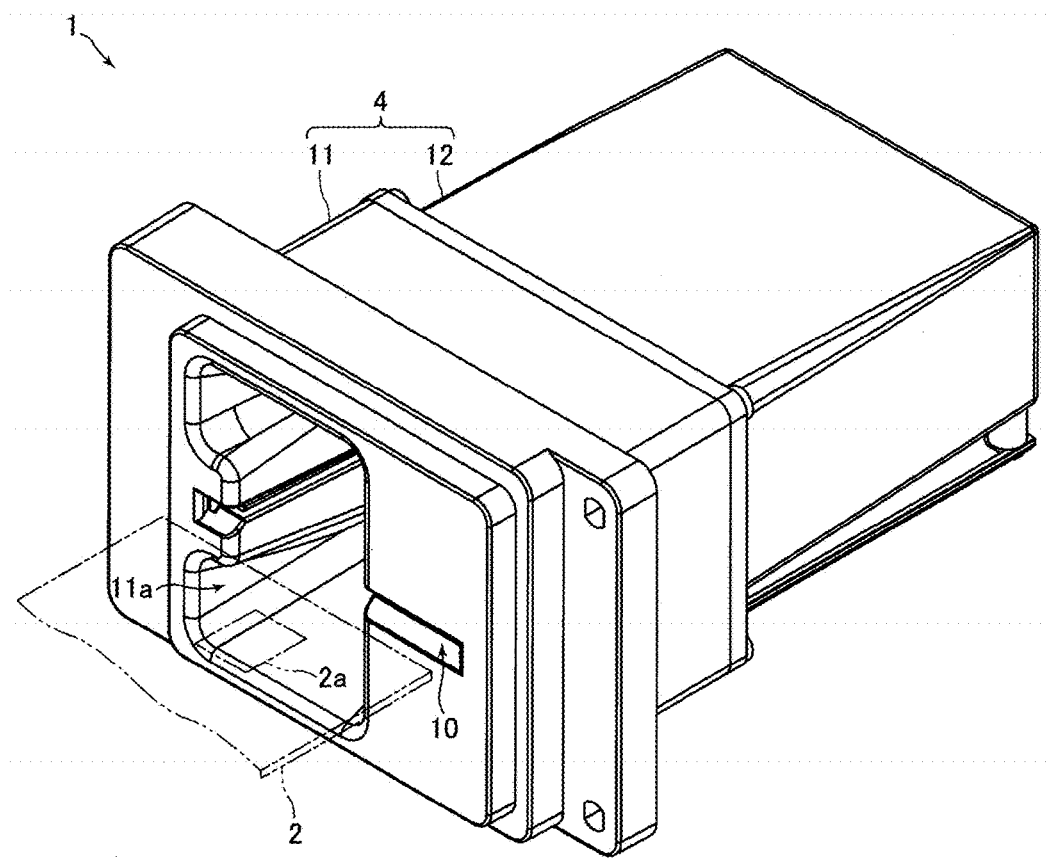
FIG. 1 is a perspective view showing a card reader in accordance with an embodiment of the present invention.
Figure 2:
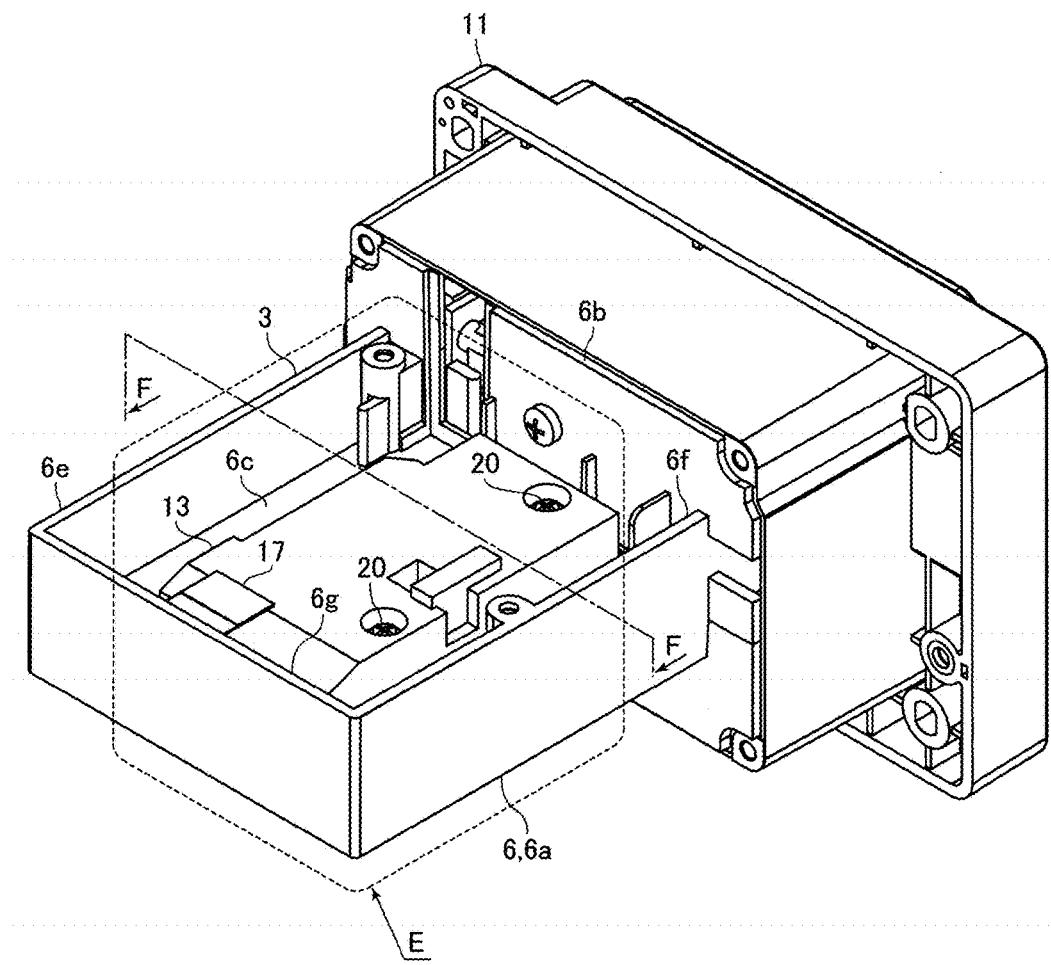
FIG. 2 is a perspective view showing a state that a case main body is detached from the card reader shown in FIG. 1 and which is viewed in another direction.
Figure 2:
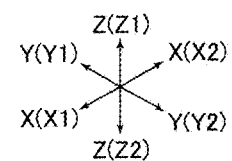
Figure 3:
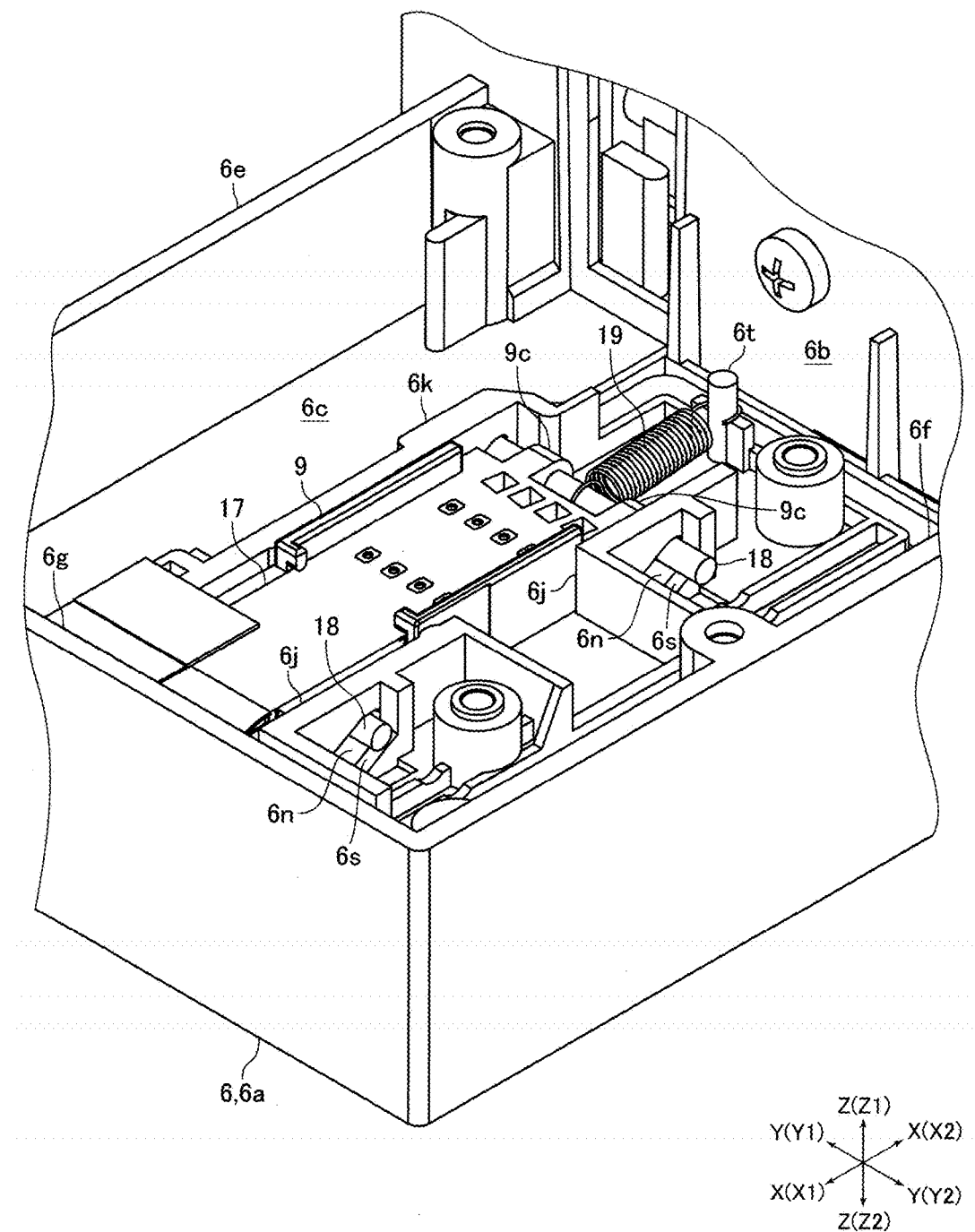
FIG. 3 is a perspective view showing the "E" part in FIG. 2 in a state that a cover member is detached.
Figure 4:
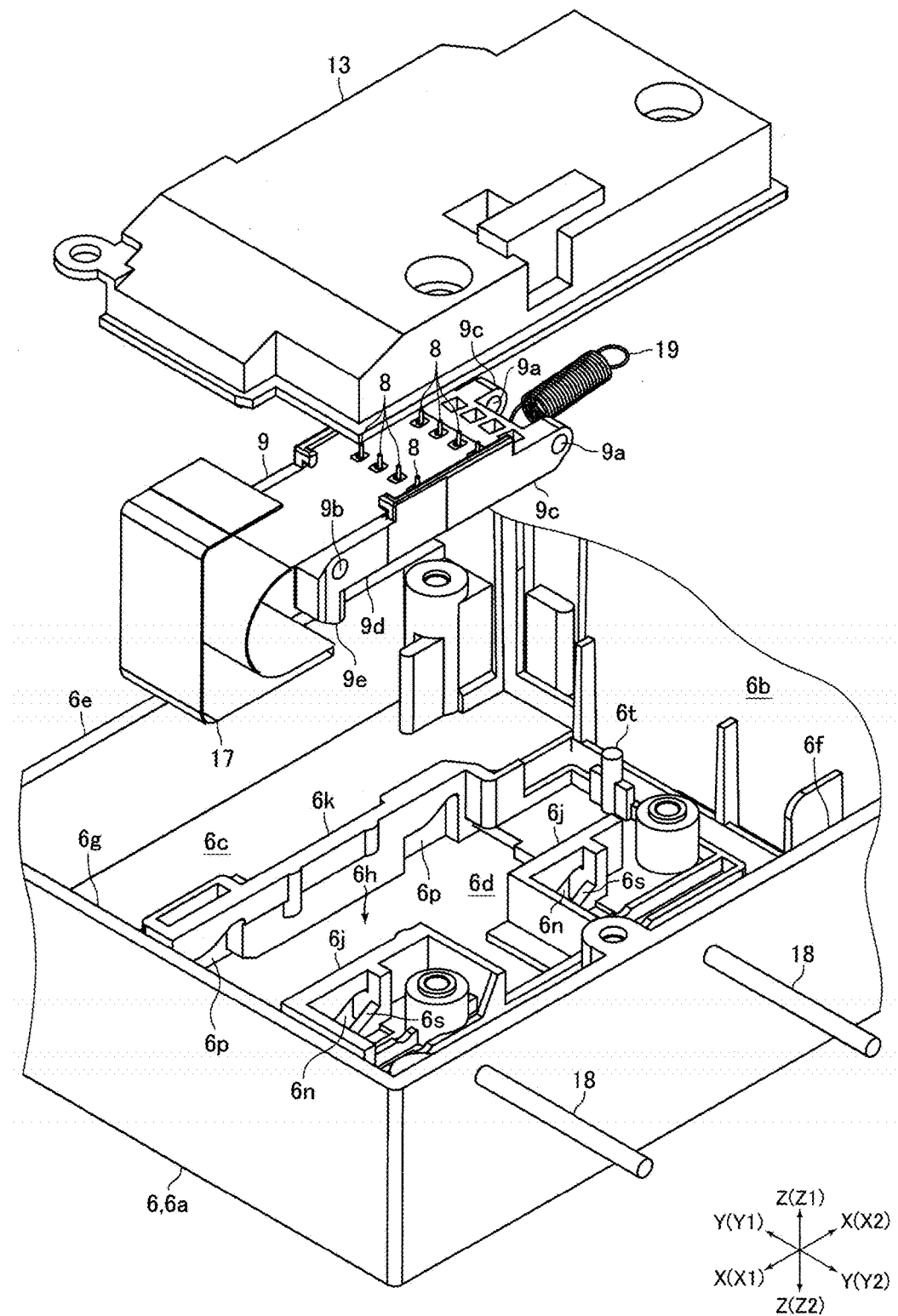
FIG. 4 is an exploded perspective view showing the "E" part in FIG. 2.

FIG. 1 is a perspective view showing a card reader 1 in accordance with an embodiment of the present invention. FIG. 2 is a perspective view showing a state that a case main body 12 is detached from the card reader 1 shown in FIG. 1 and which is viewed in another direction. FIG. 3 is a perspective view showing the "E" part in FIG. 2 in a state that a cover member 13 is detached. FIG. 4 is an exploded perspective view showing the "E" part in FIG. 2.

A card reader 1 in this embodiment is a device structured to perform reading of data recorded in a card 2 and/or recording data to a card 2. Specifically, the card reader 1 is a so-called dip-type card reader in which insertion of a card 2 into the card reader 1 and pulling-out of the card 2 from the card reader 1 are manually performed to read and record data. The card reader 1 is, for example, mounted and used in a refueling device of a unmanned or a self-service type gas station or the like.

A card 2 is, for example, a rectangular card made of vinyl chloride whose thickness is about 0.7-0.8 mm. An IC chip is incorporated into a card 2, and one face of the card 2 is, as shown in FIG. 1, formed with an external connection terminal 2a of the IC chip. Further, the other face of the card 2 is formed with a magnetic stripe in which magnetic data are recorded.

The card reader 1 includes a card reader main body 3 and a case body 4 which covers the card reader main body 3. The card reader main body 3 includes a main body frame 6 which is formed with a card moving passage 5 (see FIG. 5) where a card 2 is moved, a magnetic head structured to perform reading of magnetic data recorded on the card 2 and/or recording of magnetic data to the card 2, a plurality of IC contact springs 8 (see FIG. 4) structured to contact with the external connection terminal 2a of the card 2, and an IC contact block 9 which holds the plurality of the IC contact springs 8. The case body 4 is structured of a front cover 11 formed with an insertion port 10 for a card 2 and a case main body 12. In FIG. 3, the IC contact springs 8 are not shown.

In this embodiment, a card 2 which is manually operated is moved in the "X" direction shown in FIG. 1 and the like. In other words, the "X" direction is a moving direction of a card 2 which is moved in the card moving passage 5. Further, a card 2 is inserted to the "X1" direction and is pulled out to the "X2" direction. Further, the "Z" direction in FIG. 1 and the like perpendicular to the "X" direction is a thickness direction of a card 2 which is moved in the card moving passage 5, and the "Y" direction in FIG. 1 and the like perpendicular to the "X" direction and the "Z" direction is a width direction (short width direction) of a card 2 which is moved in the card moving passage 5.

In the following descriptions, the "X" direction is referred to as a front and rear direction, the "Y" direction is referred to as a right and left direction, and the "Z" direction is referred to as an upper and lower direction. Further, the "X1" direction side which is an inserting direction side of a card 2 to the card reader 1 is a "rear" side, and the "X2" direction side which is a pulling-out direction side of the card 2 from the card reader 1 is a "front" side. Further, the "Y1" direction side which is one side in the right and left direction is a "right" side, the "Y2" direction side which is the other side in the right and left direction is a "left" side, the "Z1" direction side which is one side in the upper and lower direction is an "upper" side, and the "Z2" direction side which is the other side in the upper and lower direction is a "lower" side.

The main body frame 6 is formed of resin. The main body frame 6 is provided with a box-shaped card accommodation part 6a in which a rear end portion of a card 2 inserted into the card reader 1 (in other words, a card 2 inserted through the insertion port 10) is accommodated, and a partition part 6b which is enlarged in a flange shape from a front end of the card accommodation part 6a. The partition part 6b is formed in a substantially rectangular frame shape which is enlarged in the upper and lower direction and the right and left direction. Further, the main body frame 6 is provided with a head arrangement part in which the magnetic head is disposed, and a card guide part for guiding a card 2 inserted through the insertion port 10. The head arrangement part and the card guide part are formed so as to protrude to the front side from a front face of the partition part 6b. The head arrangement part and the card guide part are formed in a separated state with a space therebetween in the right and left direction.

An inside of the card accommodation part 6a is structured with a part of the card moving passage 5. The card accommodation part 6a is structured of an upper side face part 6c as a side face part structuring an upper side face of the card moving passage 5, a lower side face part 6d structuring a lower side face of the card moving passage 5, a right side face part 6e structuring a right side face of the card moving passage 5, a left side face part 6f structuring a left side face of the card moving passage 5, and a rear side face part 6g structuring a rear side face of the card moving passage 5. The upper direction ("Z1" direction) in this embodiment is a first direction which is one side in the thickness direction of a card 2.

The upper side face part 6c is formed with an opening part 6h in which a part of the IC contact block 9 is disposed (see FIG. 4). The opening part 6h is formed so as to be penetrated through the upper side face part 6c in the upper and lower direction and is communicated with the card moving passage 5. A cover member 13 is attached to the upper side face part 6c so as to close the opening part 6h from the upper side and cover the IC contact block 9 from the upper side. The lower side face part 6d, the right side face part 6e, the left side face part 6f and the rear side face part 6g are respectively formed with no opening part which is communicated with the card moving passage 5 from the outside of the card accommodation part Ga.

The front cover 11 is disposed on a front face side of the main body frame 6 and covers the head arrangement part and the card guide part. Further, the front cover 11 structures a front face of the card reader 1. As shown in FIG. 1, the front cover 11 is formed with a finger insertion part 11a which is recessed toward the rear side from a front face of the front cover 11. The finger insertion part 11a is formed in a size so that fingers of a user are capable of being inserted and, when a card 2 is to be inserted into the card reader 1 by a user and, when the card 2 is to be pulled out from the card reader 1 by the user, fingers of the user are inserted to the finger insertion part 11a.

The case main body 12 is formed in a substantially rectangular parallelepiped box shape whose front end is opened. The case main body 12 covers the card accommodation part 6a and the partition part 6b. The front cover 11 and the case main body 12 are fixed to each other in a state that a rear end of the front cover 11 and a front end of the case main body 12 are abutted with each other. The case body 4 covers both of the upper and lower faces, both of the right and left faces and both of the front and rear faces of the card reader main body 3.

In this embodiment, a region outside the card accommodation part 6a and surrounded by the partition part 6b, the upper side face part 6c, the lower side face part 6d, the right side face part 6e, the left side face part 6f, the rear side face part 6g, the cover member 13 and the case main body 12 is structured to be a waterproof region to which penetration of liquid such as water is not permitted. On the other hand, a front side region of the partition part 6b, an inner side region of the cover member 13 and the card moving passage 5 is structured to be a liquid-penetration allowable region which permits penetration of liquid such as water. The cover member 13 functions as a waterproof cover which prevents penetration of liquid from the card moving passage 5 to an upper side of the upper side face part 6c. In this embodiment, the cover member 13 also functions to prevent entry of dust and dirt from the card moving passage 5 to the upper side of the upper side face part 6c.

(Structure of IC Contact Block and Peripheral Part of IC Contact Block)

Figure 5:
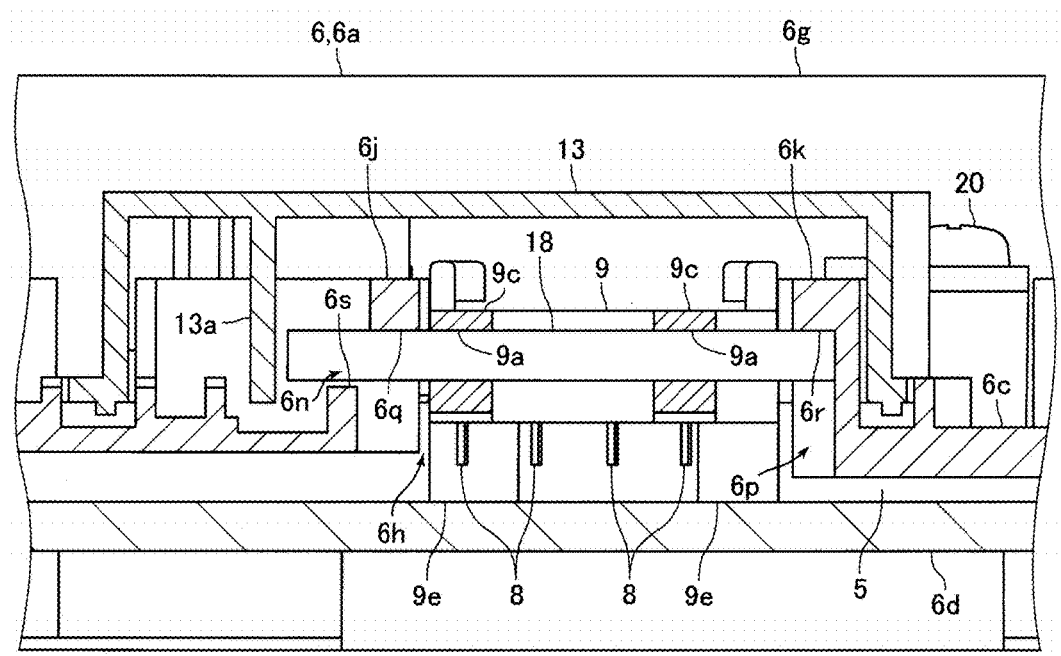
FIG. 5 is a cross-sectional view showing the "F-F" cross section in FIG. 2.

FIG. 5 is a cross-sectional view showing the "F-F" cross section in FIG. 2.

The IC contact block 9 is formed of resin. Further, the IC contact block 9 is formed in a flat and substantially rectangular block shape. The IC contact block 9 holds a plurality of IC contact springs 8 as described above. A flexible printed circuit board 17 is connected with upper end side portions of the IC contact springs 8. The flexible printed circuit board 17 is extended toward the rear side of the IC contact block 9. The IC contact block 9 is arranged so that the IC contact springs 8 face the card moving passage 5 from the upper side. Further, the IC contact block 9 is movable between a contact position where the IC contact springs 8 are capable of contacting with an external connection terminal 2a of a card 2 and a retreated position where the IC contact springs 8 are retreated so as not to contact with the external connection terminal 2a.

The card reader 1 includes guide shafts 18 for moving the IC contact block 9 between the contact position and the retreated position, and a tension coil spring 19 which urges the IC contact block 9 toward the retreated position. The card reader 1 in this embodiment includes two guide shafts 18 and one tension coil spring 19. The main body frame 6 is provided with a shaft holding part 6j as a first shaft holding part which holds one end side portion of the guide shaft 18, and a shaft holding part 6k as a second shaft holding part which holds the other end side portion of the guide shaft 18.

The guide shaft 18 is separately formed from the IC contact block 9. Further, the guide shaft 18 is formed of steel. Specifically, the guide shaft 18 is formed of stainless steel. The guide shaft 18 is formed in a long and thin columnar shape. The guide shaft 18 is disposed so that an axial direction of the guide shaft 18 and the right and left direction are coincided with each other. Two guide shafts 18 are disposed in a separated state from each other with a predetermined space therebetween in the front and rear direction.

The IC contact block 9 is formed with insertion holes 9a and 9b to which two guide shafts 18 are inserted so as to be penetrated in the right and left direction. The insertion hole 9a is formed in each of two protruded parts 9c formed on the front end side of the IC contact block 9. The insertion hole 9b is formed in each of two protruded parts 9d formed on the rear end side of the IC contact block 9.

Two protruded parts 9c are formed so as to be protruded to the front side and are formed in a separated state with a predetermined space therebetween in the right and left direction. Two protruded parts 9d are formed so as to be protruded to the rear side and are formed in a separated state with a predetermined space therebetween in the right and left direction. The insertion hole 9a is penetrated through the protruded part 9c in the right and left direction, and the insertion hole 9b is penetrated through the protruded part 9d in the right and left direction. The insertion holes 9a and 9b are round holes. An inner diameter of each of the insertion holes 9a and 9b is substantially equal to an outer diameter of the guide shaft 18.

Further, the IC contact block 9 is formed with abutting parts 9e with which a rear end of a card 2 moved in the card moving passage 5 toward the rear side is abutted. The abutting part 9e is formed at a rear end part of the protruded part 9d. Further, the abutting part 9e is formed so as to protrude toward the lower side. As shown in FIG. 5, the abutting parts 9e are disposed in an inside of the card moving passage 5.

The shaft holding parts 6j and 6k are formed on an upper side face (upper face) of the upper side face part 6c. Further, the shaft holding parts 6j and 6k are formed so as to stand up from the upper face of the upper side face part 6c toward the upper side. As described above, the main body frame 6 is formed of resin, and the shaft holding parts 6j and 6k are formed of resin. In this embodiment, the upper side face part 6c is formed with two shaft holding parts 6j each of which holds each left end side portion of two guide shafts 18 and one shaft holding part 6k which holds both of the right end side portions of two guide shafts 18.

The shaft holding part 6j and the shaft holding part 6k are disposed in a separated state with a predetermined space therebetween in the right and left direction. Specifically, the shaft holding part 6j is formed so as to stand up to the upper side from an edge on the left side of the opening part 6h, and the shaft holding part 6k is formed so as to stand up to the upper side from an edge on the right side of the opening part 6h. Further, two shaft holding parts 6j are disposed in a separated state with a space therebetween in the front and rear direction. The IC contact block 9 is disposed between the shaft holding part 6j and the shaft holding part 6k in the right and left direction.

The shaft holding part 6j is formed with an arrangement hole 6n in which a left end side portion of the guide shaft 18 is disposed. The arrangement hole 6n is penetrated through the shaft holding part 6j in the right and left direction. Further, the arrangement hole 6n is formed in a size so that the guide shaft 18 disposed with the right and left direction as its axial direction is capable of passing in the right and left direction. Further, the arrangement hole 6n is formed in an elongated hole shape. The shaft holding part 6k is formed with an arrangement recessed part 6p in which a right end side portion of the guide shaft 18 is disposed. In this embodiment, the shaft holding part 6k is formed with two arrangement recessed parts 6p in which right end side portions of two guide shafts 18 are respectively disposed. The arrangement recessed part 6p is formed so as to recess from the left side face of the shaft holding part 6k to the right side, and the arrangement recessed part 6p is not penetrated through the shaft holding part 6k in the right and left direction.

The arrangement hole 6n in this embodiment is a first cam groove structured to move the IC contact block 9 together with the guide shaft 18 between the contact position and the retreated position. Further, the arrangement recessed part 6p is a second cam groove structured to move the IC contact block 9 together with the guide shaft 18 between the contact position and the retreated position. In other words, the shaft holding part 6k is formed with the second cam groove structured to move the IC contact block 9 together with the guide shaft 18 between the contact position and the retreated position.

Therefore, when the guide shaft 18 whose left end side portion is disposed in the arrangement hole 6n and whose right end side portion is disposed in the arrangement recessed part 6p is moved along the arrangement hole 6n and the arrangement recessed part 6p, the IC contact block 9 is moved between the contact position and the retreated position. Specifically, the IC contact block 9 is moved between the contact position where the IC contact block 9 is disposed on the rear lower side and the retreated position where the IC contact block 9 is disposed on the front upper side. Further, the IC contact block 9 is moved together with the guide shafts 18 with respect to the shaft holding parts 6j and 6k between the contact position and the retreated position.

As described above, the IC contact block 9 is urged toward the retreated position by the tension coil spring 19. In other words, the IC contact block 9 is urged toward the front upper side by the tension coil spring 19. As shown in FIG. 5, the guide shaft 18 is contacted with an upper face 6q of the arrangement hole 6n and an upper face 6r of the arrangement recessed part 6p, and the upper faces 6q and 6r are cam faces for guiding the guide shaft 18. The upper face 6q and the upper face 6r are formed to be the same shape as each other. Further, the upper face 6q and the upper face 6r are disposed at the same position as each other in the front and rear direction and the upper and lower direction. Further, the upper faces 6q and 6r are formed in a predetermined shape so that the IC contact block 9 is moved between the contact position and the retreated position.

The arrangement hole 6n is formed with an under face 6s which prevents coming-off of the guide shaft 18 to a lower side. The upper face 6q of the arrangement hole 6n and the under face 6s of the arrangement hole 6n are, as shown in FIG. 5, disposed at positions displaced from each other in the right and left direction. On the other hand, the arrangement recessed part 6p is not formed with an under face, and the lower end of the arrangement recessed part 6p is communicated with the card moving passage 5.

The main body frame 6 in this embodiment is structured of an upper frame having the upper side face part 6c and a lower frame having the lower side face part 6d, in other words, two frames which are divided in the upper and lower direction. Further, the upper face 6q of the arrangement hole 6n and the under face 6s of the arrangement hole 6n are disposed at positions displaced from each other in the right and left direction and, in addition, the under face is not formed in the arrangement recessed part 6p and thus the upper frame can be formed by using a die which is divided into two pieces in the upper and lower direction. In accordance with an embodiment of the present invention, the upper face 6q and the under face 6s may be disposed at the same position in the right and left direction, and an under face may be formed in the arrangement recessed part 6p.

One end of the tension coil spring 19 is attached to one of two guide shafts 18, and the other end of the tension coil spring 19 is attached to the main body frame 6. Specifically, a rear end of the tension coil spring 19 is attached to the guide shaft 18 disposed on the front side, and a front end of the tension coil spring 19 is attached to a spring engaging projection 6t which is formed on the upper face of the upper side face part 6c. Further, the rear end of the tension coil spring 19 is attached to the guide shaft 18 between two protruded parts 9c in the right and left direction.

In this embodiment, when a rear end of a card 2 which is moved in the card moving passage 5 toward the rear side (in other words, a rear end of a card 2 inserted into an inside of the card reader 1) is abutted with the abutting parts 9e, the IC contact block 9 located at the retreated position starts to move toward the contact position. Further, when the card 2 is further inserted, the IC contact block 9 is reached to the contact position. When the IC contact block 9 is reached to the contact position, the IC contact springs 8 are contacted with an external connection terminal 2a of the card 2 at a predetermined contact pressure, and reading of data recorded in the card 2 and recording of data to the card 2 are performed. Further, the card 2 inserted into the card reader 1 is pulled out, the IC contact block 9 located at the contact position is moved to the retreated position by an urging force of the tension coil spring 19.

The cover member 13 is formed in a substantially rectangular parallelepiped box shape whose under face is opened. Further, the cover member 13 is formed in a flat box shape whose thickness in the upper and lower direction is thin. As described above, the cover member 13 closes the opening part 6h from the upper side. Further, the cover member 13 covers the IC contact block 9 from both sides in the front and rear direction, both sides in the right and left direction, and the upper side. In addition, the cover member 13 covers the shaft holding parts 6j and 6k, the spring engaging projection 6t and the tension coil spring 19. Specifically, the cover member 13 covers the shaft holding parts 6j and 6k, the spring engaging projection 6t and the tension coil spring 19 from both sides in the front and rear direction, both sides in the right and left direction, and the upper side. In this embodiment, the flexible printed circuit board 17 is extended toward the rear side of the cover member 13 in a rear end part of the cover member 13. In the extended part of the flexible printed circuit board 17, sealing treatment for preventing liquid penetration to the outside of the cover member 13 is performed.

The cover member 13 is detachably attached to the main body frame 6. Specifically, the cover member 13 is detachably attached to the upper side face part 6c by a plurality of screws 20 (see FIG. 2). The cover member 13 is, as shown in FIG. 5, formed with a coming-off prevention part 13a structured to prevent coming-off of the guide shaft 18 from the shaft holding parts 6j and 6k to the shaft holding part 6j side (in other words, to the left side) in the right and left direction.

The coming-off prevention part 13a is formed in a flat plate shape and is disposed so that a thickness direction of the coming-off prevention part 13a and the right and left direction are coincided with each other. Further, the coming-off prevention part 13a is formed so as to protrude from the upper face part of the cover member 13 to the lower side and is disposed in an inside of the cover member 13. In other words, the coming-off prevention part 13a is, as shown in FIG. 5, disposed on the right side with respect to the left side face part of the cover member 13. Further, the cover member 13 is formed with two coming-off prevention parts 13a each of which prevents coming-off of each of the two guide shafts 18. Further, the coming-off prevention part 13a is disposed on the left side with respect to the guide shaft 18.

As described above, in this embodiment, the coming-off prevention part 13a which prevents coming-off of the guide shaft 18 from the shaft holding parts 6j and 6k to the left side is detachably attached to the main body frame 6 on the shaft holding part 6*j* side. Further, a part of the cover member 13 is formed as the coming-off prevention part 13*a*. The coming-off prevention part 13*a* in this embodiment is a coming-off prevention member which prevents coming-off of the guide shaft 18 from the shaft holding parts 6*j* and 6*k* to the left side.

As described above, the IC contact block 9 is disposed between the shaft holding part 6*j* and the shaft holding part 6*k* in the right and left direction. Further, the IC contact block 9 is formed with the insertion holes 9*a* and 9*b* so as to be penetrated through in the right and left direction and the guide shafts 18 separately formed from the IC contact block 9 are inserted and passed through the insertion holes 9*a* and 9*b*, and the shaft holding part 6*j* is formed with the arrangement hole 6*n* so as to be penetrated through in the right and left direction so that a left end side portion of the guide shaft 18 is disposed in the arrangement hole 6*n* and the guide shaft 18 is passed through the arrangement hole 6*n* in the right and left direction. In addition, the coming-off prevention part 13*a* which prevents coming-off of the guide shaft 18 from the shaft holding parts 6*j* and 6*k* to the left side is formed in the cover member 13, and the cover member 13 is detachably attached to the upper side face part 6*c* by the screws 20.

Therefore, in this embodiment, when the cover member 13 is detached from the upper side face part 6*c*, the guide shaft 18 inserted through the insertion holes 9*a* and 9*b* of the IC contact block 9 can be pulled out to the left side. Further, when the guide shafts 18 are pulled out, the IC contact block 9 disposed between the shaft holding part 6*j* and the shaft holding part 6*k* in the right and left direction can be detached. In this embodiment, a space in which the guide shaft 18 inserted through the insertion holes 9*a* and 9*b* is capable of being pulled out to the left side is formed between the shaft holding part 6*j* and the left side face part 6*f*.

Principal Effects in this Embodiment

As described above, in this embodiment, when the cover member 13 is detached from the upper side face part 6*c*, the guide shafts 18 inserted through the insertion holes 9*a* and 9*b* of the IC contact block 9 can be pulled out to the left side. Further, when the guide shafts 18 are pulled out, the IC contact block 9 disposed between the shaft holding part 6*j* and the shaft holding part 6*k* in the right and left direction can be detached. Therefore, according to this embodiment, the IC contact block can be easily detached.

In this embodiment, the arrangement recessed part 6*p* which is not penetrated through the shaft holding part 6*k* in the right and left direction is formed as the second cam groove for moving the IC contact block 9 between the contact position and the retreated position. Therefore, according to this embodiment, coming-off of the guide shaft 18 from the shaft holding parts 6*j* and 6*k* to the right side can be prevented by utilizing a bottom face (side face on the right side) of the arrangement recessed part 6*p*. Accordingly, in this embodiment, a member for preventing coming-off of the guide shaft 18 from the shaft holding parts 6*j* and 6*k* to the right side is not required to provide separately. As a result, in this embodiment, the structure of the card reader 1 can be simplified. Further, in this embodiment, when the cover member 13 is attached in a state that the right end of the guide shaft 18 inserted through the arrangement hole 6*n* of the shaft holding part 6*j* and the insertion holes 9*a* and 9*b* of the IC contact block 9 is pressed against the bottom face of the arrangement recessed part 6*p*, attachment of the IC contact block 9 can be completed. Therefore, according to this embodiment, attaching work of the IC contact block 9 is easy.

In this embodiment, the guide shaft 18 is formed of steel and the shaft holding parts 6*j* and 6*k* are formed of resin. Therefore, according to this embodiment, wear resistance of the guide shaft 18 can be enhanced, and slidability between the upper face 6*q* of the arrangement hole 6*n* and the upper face 6*r* of the arrangement recessed part 6*p*, which are cam faces, and the guide shaft 18 can be enhanced. Further, in this embodiment, a thermal contraction amount of the guide shaft 18 due to influence of ambient temperature change and the like is reduced. Therefore, relative positions of the IC contact springs 8 held by the IC contact block 9 in which the guide shafts 18 are inserted through the insertion holes 9*a* and 9*b* to an external connection terminal 2*a* of a card 2 located in the card moving passage 5 can be suppressed from being displaced due to ambient temperature change and the like. Accordingly, in this embodiment, reading quality and recording quality of data to a card 2 can be suppressed from being deteriorated due to ambient temperature change and the like.

In this embodiment, the coming-off prevention part 13*a* is formed in the cover member 13 which functions as a waterproof cover structured to prevent penetration of liquid from the card moving passage 5 to the upper side with respect to the upper side face part 6*c*. Therefore, according to this embodiment, coming-off of the guide shaft 18 from the shaft holding parts 6*j* and 6*k* to the left side can be prevented by utilizing a part of the cover member 13 which functions as a waterproof cover. Accordingly, in this embodiment, in comparison with a case that a coming-off prevention member is separately provided for preventing coming-off of the guide shaft 18 from the shaft holding parts 6*j* and 6*k* to the left side in addition to the cover member 13 that is a waterproof cover, the structure of the card reader 1 can be simplified.

In this embodiment, the rear end of the tension coil spring 19 is attached to one of the two guide shafts 18. Therefore, according to this embodiment, the IC contact block 9 can be urged toward the retreated position by utilizing the guide shaft 18. Accordingly, in this embodiment, the structure of the card reader 1 can be simplified.

OTHER EMBODIMENTS

Although the present invention has been shown and described with reference to a specific embodiment, various changes and modifications will be apparent to those skilled in the art from the teachings herein.

For example, in the embodiment described above, it may be structured that coming-off of the guide shaft 18 from the shaft holding parts 6*j* and 6*k* to the left side is prevented by the left side face part structuring the left side face of the cover member 13. In this case, the left side face part of the cover member 13 functions as a coming-off prevention member. Further, in the embodiment described above, it may be structured that coming-off of the guide shaft 18 from the shaft holding parts 6*j* and 6*k* to the left side is prevented by a coming-off prevention member which is detachably attached to the main body frame 6 other than the cover member 13. Alternatively, coming-off of the guide shaft 18 from the shaft holding parts 6*j* and 6*k* to the left side may be prevented by a coming-off prevention member such as an E-shaped snap ring which is detachably attached to the guide shaft 18. In this case, when the card reader 1 is used in an environment that liquid such as water is not applied, the card reader 1 may be provided with no cover member 13.

In the embodiment described above, instead of the arrangement recessed part 6p, it may be structured that an arrangement hole in which a right end side portion of the guide shaft 18 is disposed and which is penetrated through the shaft holding part 6k in the right and left direction is formed in the shaft holding part 6k. In this case, for example, the arrangement hole is similarly formed to the arrangement hole 6n and is formed in a size so that the guide shaft 18 is capable of passing in the right and left direction. Further, the arrangement hole is formed as the second cam groove.

In a case that the arrangement hole which is formed in the shaft holding part 6k is similarly formed to the arrangement hole 6n, for example, a coming-off prevention part for preventing coming-off of the guide shaft 18 from the shaft holding parts 6j and 6k to the right side is formed in the cover member 13, and the coming-off prevention part is disposed on the right side with respect to the guide shaft 18. Alternatively, the right side face part of the cover member 13 is used as a coming-off prevention part for preventing coming-off of the guide shaft 18 from the shaft holding parts 6j and 6k to the right side.

Further, coming-off of the guide shaft 18 from the shaft holding parts 6j and 6k to the right side may be prevented by a member which is detachably attached to the main body frame 6 other than the cover member 13. Alternatively, coming-off of the guide shaft 18 from the shaft holding parts 6j and 6k to the right side may be prevented by an E-shaped snap ring or the like which is detachably attached to the guide shaft 18. In this case, when the card reader 1 is used in an environment that liquid such as water is not applied, the card reader 1 may be provided with no cover member 13.

In the embodiment described above, instead of the arrangement recessed part 6p, in a case that an arrangement hole in which a right end side portion of the guide shaft 18 is disposed and which penetrates through the shaft holding part 6k in the right and left direction is formed in the shaft holding part 6k, the arrangement hole may be formed in a size that the guide shaft 18 is unable to pass through in the right and left direction. In this case, for example, a small diameter part whose outer diameter is small is formed in the right end side of the guide shaft 18, and the small diameter part is disposed in this arrangement hole. Further, coming-off of the guide shaft 18 from the shaft holding parts 6j and 6k to the right side is prevented by a step face formed at a left end of the small diameter part of the guide shaft 18 and a left side face of the shaft holding part 6k.

In the embodiment described above, it may be structured that the insertion holes 9a and 9b which are formed in the IC contact block 9 are formed so as to be cam grooves for moving the IC contact block 9 between the contact position and the retreated position together with the guide shafts 18. In this case, the arrangement hole 6n is formed to be a round hole and the arrangement recessed part 6p is formed to be a round recessed part. Further, an inner diameter of the arrangement hole 6n and an inner diameter of the arrangement recessed part 6p are set to be substantially equal to an outer diameter of the guide shaft 18. In this case, the IC contact block 9 is moved between the contact position and the retreated position with respect to the shaft holding parts 6j and 6k and the guide shafts 18.

As described above, in a case that the arrangement hole 6n is the first cam groove and the arrangement recessed part 6p is the second cam groove, the insertion holes 9a and 9b formed in the IC contact block 9 are formed in a round-hole shape. Therefore, in comparison with a case that the insertion holes 9a and 9b of the IC contact block 9 are formed so as to be cam grooves, a structure of the IC contact block 9 whose shape becomes easily complicated can be simplified.

In the embodiment described above, it may be structured that the card reader 1 includes three or more guide shafts 18. Further, in the embodiment described above, the card reader main body 3 may include no magnetic head. In addition, in the embodiment described above, the card reader 1 is a manual type card reader. However, the card reader 1 may be a card conveyance type card reader including a card conveying mechanism structured to automatically convey a card 2. Further, in the embodiment described above, the card 2 may be a PET (polyethylene terephthalate) card whose thickness is about 0.18-0.36 mm or may be a paper card having a predetermined thickness.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card comprising an IC chip having an external connection terminal, the card reader comprising:
    a plurality of IC contact springs structured to contact with the external connection terminal of the IC chip which is formed on the card;
    an IC contact block which holds the plurality of the IC contact springs;
    a main body frame comprising a card moving passage where the card is moved; and
    a guide shaft structured to move the IC contact block between a contact position where the IC contact springs contact with the external connection terminal and a retreated position where the IC contact springs are retreated so as not to contact with the external connection terminal;
    wherein when a direction which is perpendicular to a moving direction of the card moved in the card moving passage and to a thickness direction of the card moved in the card moving passage is referred to as a right and left direction, the guide shaft is separately formed from the IC contact block and is disposed so that an axial direction of the guide shaft and the right and left direction are coincided with each other;
    wherein the main body frame comprises:
        a first shaft holding part which holds one end side portion of the guide shaft; and
        a second shaft holding part which holds another end side portion of the guide shaft;
    wherein the IC contact block is disposed between the first shaft holding part and the second shaft holding part in the right and left direction;
    wherein the IC contact block comprises an insertion hole so as to be penetrated through in the right and left direction through which the guide shaft is inserted and an abutting part structured to abut with one end of the card in the moving direction of the card;
    wherein the first shaft holding part comprises an arrangement hole penetrated through in the right and left direction in which the one end side portion of the guide shaft is disposed and through which the guide shaft is capable of passing in the right and left direction;

wherein the arrangement hole is a first cam groove structured to move the IC contact block between the contact position and the retreated position together with the guide shaft and, the second shaft holding part comprises a second cam groove structured to move the IC contact block between the contact position and the retreated position together with the guide shaft;

wherein the IC contact block is structured to move together with the guide shaft between the contact position and the retreated position with respect to the first shaft holding part and the second shaft holding part;

wherein a coming-off prevention member structured to prevent coming-off of the guide shaft from the first shaft holding part and the second shaft holding part to a side of the first shaft holding part in the right and left direction is detachably attached to the guide shaft or the main body frame;

wherein the IC contact block is structured such that, when the one end of the card is abutted with the abutting part, the IC contact block located at the retreated position starts to move toward the contact position;

wherein the coming-off prevention member is detachably attached to the main body frame;

wherein when one side in the thickness direction of the card is referred to as a first direction, the main body frame comprises a side face part structuring a face on a side of the first direction of the card moving passage, the side face part comprises an opening part which is penetrated through the side face part in the thickness direction of the card so that a part of the IC contact block is disposed in the opening part, the first shaft holding part and the second shaft holding part are formed on the face on the side of the first direction of the side face part, a cover member which closes the opening part from the side of the first direction and covers the first shaft holding part, the second shaft holding part, and the IC contact block from the side of the first direction is detachably attached to the side face part, and a part of the cover member is the coming-off prevention member.

2. The card reader according to claim 1, wherein the second shaft holding part comprises an arrangement recessed part in which the other end side portion of the guide shaft is disposed and which is recessed from one side face in the right and left direction of the second shaft holding part toward the other in the right and left direction, the arrangement recessed part is the second cam groove, and the coming-off prevention member is detachably attached to the guide shaft or the main body frame on a side of the first shaft holding part in the right and left direction.

3. The card reader according to claim 2, wherein the guide shaft is formed of steel, and the first shaft holding part and the second shaft holding part are formed of resin.

4. The card reader according to claim 2, further comprising:

two guide shafts as the guide shaft; and a tension coil spring structured to urge the IC contact block toward the retreated position, wherein one end side of the tension coil spring is attached to one of the two guide shafts, and another end side of the tension coil spring is attached to the main body frame.

5. The card reader according to claim 4, wherein the cover member is a waterproof cover structured to prevent penetration of liquid from the card moving passage to the side of the first direction with respect to the side face part.

6. The card reader according to claim 2, wherein the cover member is a waterproof cover structured to prevent penetration of liquid from the card moving passage to the side of the first direction with respect to the side face part.

7. The card reader according to claim 1, further comprising:

two guide shafts as the guide shaft; and a tension coil spring structured to urge the IC contact block toward the retreated position, wherein one end side of the tension coil spring is attached to one of the two guide shafts, and another end side of the tension coil spring is attached to the main body frame.

8. The card reader according to claim 1, wherein the cover member is a waterproof cover structured to prevent penetration of liquid from the card moving passage to the side of the first direction with respect to the side face part.

9. A card reader for use with a card comprising an IC chip having an external connection terminal, the card reader comprising:

a plurality of IC contact springs structured to contact with the external connection terminal of the IC chip which is formed on the card;

an IC contact block which holds the plurality of the IC contact springs;

a main body frame comprising a card moving passage where the card is moved; and a guide shaft structured to move the IC contact block between a contact position where the IC contact springs contact with the external connection terminal and a retreated position where the IC contact springs are retreated so as not to contact with the external connection terminal;

wherein when a direction which is perpendicular to a moving direction of the card moved in the card moving passage and to a thickness direction of the card moved in the card moving passage is referred to as a right and left direction, the guide shaft is separately formed from the IC contact block and is disposed so that an axial direction of the guide shaft and the right and left direction are coincided with each other;

wherein the main body frame comprises:

a first shaft holding part which holds one end side portion of the guide shaft; and a second shaft holding part which holds another end side portion of the guide shaft;

wherein the IC contact block is disposed between the first shaft holding part and the second shaft holding part in the right and left direction;

wherein the IC contact block comprises an insertion hole so as to be penetrated through in the right and left direction through which the guide shaft is inserted and an abutting part structured to abut with one end of the card in the moving direction of the card;

wherein the first shaft holding part comprises an arrangement hole penetrated through in the right and left direction in which the one end side portion of the guide shaft is disposed and through which the guide shaft is capable of passing in the right and left direction;

wherein the insertion hole is a cam groove structured to move the IC contact block between the contact position and the retreated position together with the guide shaft;

wherein the IC contact block is structured to move between the contact position and the retreated position with respect to the first shaft holding part, the second shaft holding part and the guide shaft;

wherein a coming-off prevention member structured to prevent coming-off of the guide shaft from the first shaft holding part and the second shaft holding part to a side of the first shaft holding part in the right and left direction is detachably attached to the guide shaft or the main body frame; and wherein the IC contact block is structured such that, when the one end of the card is abutted with the abutting part, the IC contact block located at the retreated position starts to move toward the contact position;

wherein the coming-off prevention member is detachably attached to the main body frame;

wherein when one side in the thickness direction of the card is referred to as a first direction, the main body frame comprises a side face part structuring a face on a side of the first direction of the card moving passage, the side face part comprises an opening part which is penetrated through the side face part in the thickness direction of the card so that a part of the IC contact block is disposed in the opening part, the first shaft holding part and the second shaft holding part are formed on the face on the side of the first direction of the side face part, a cover member which closes the opening part from the side of the first direction and covers the first shaft holding part, the second shaft holding part, and the IC contact block from the side of the first direction is detachably attached to the side face part, and a part of the cover member is the coming-off prevention member.

* * * * *